United States Patent
Morikawa et al.

(10) Patent No.: US 11,427,758 B2
(45) Date of Patent: Aug. 30, 2022

(54) METHOD FOR PRODUCING β-SIALON FLUORESCENT MATERIAL

(71) Applicant: NICHIA CORPORATION, Anan (JP)

(72) Inventors: Motoharu Morikawa, Anan (JP); Shoji Hosokawa, Tokushima (JP); Takashi Kaide, Anan (JP); Kenichi Aoyagi, Itano-gun (JP)

(73) Assignee: NICHIA CORPORATION, Anan (JP)

( * ) Notice: Subject to any disclaimer, the term of this patent is extended or adjusted under 35 U.S.C. 154(b) by 123 days.

(21) Appl. No.: 16/504,937

(22) Filed: Jul. 8, 2019

(65) Prior Publication Data

US 2019/0330528 A1  Oct. 31, 2019

Related U.S. Application Data (63) Continuation-in-part of application No. 15/378,690, filed on Dec. 14, 2016, now Pat. No. 10,385,267.

(30) Foreign Application Priority Data

Dec. 15, 2015 (JP) .................... 2015-244160
Dec. 9, 2016 (JP) .................... 2016-238927

(51) Int. Cl.
  *C09K 11/77* (2006.01)
  *C09K 11/08* (2006.01)
(52) U.S. Cl.
  CPC ...... *C09K 11/7734* (2013.01); *C09K 11/0883* (2013.01)

(58) Field of Classification Search
  CPC .......... C09K 11/7734; C09K 11/77342; C09K 11/77344; C09K 11/77346; C09K 11/77347; C09K 11/77348
  See application file for complete search history.

(56) References Cited

U.S. PATENT DOCUMENTS 3,023,340 A * 2/1962 Repsher ................. C09K 11/02
                                                               313/486
2007/0108896 A1  5/2007 Hirosaki
(Continued)

FOREIGN PATENT DOCUMENTS

JP  2005255895 A  9/2005
JP  2007326981 A  12/2007
(Continued)

OTHER PUBLICATIONS

MacKenzie, Carbothermal synthesis of beta-sialon from mechanochemically activated precursors, Journal of the European Ceramic Society 26 (2006) 209-215 (Year: 2006).
(Continued)

*Primary Examiner* — Matthew E. Hoban
(74) *Attorney, Agent, or Firm* — Hunton Andrews Kurth LLP (57) ABSTRACT

A method for producing β-sialon fluorescent material having excellent emission intensity is provided. The method for producing β-sialon fluorescent material includes providing a composition comprising silicon nitride that contains aluminium, an oxygen atom, and europium, heat treating the composition, contacting the heat-treated composition with a basic substance, and washing the composition, which has been contacted with the basic substance, with an acidic liquid medium.

16 Claims, 2 Drawing Sheets

(56) References Cited

U.S. PATENT DOCUMENTS

| | | |
|---|---|---|
| 2009/0021141 A1 | 1/2009 | Emoto et al. |
| 2010/0053932 A1 | 3/2010 | Emoto et al. |
| 2010/0213820 A1* | 8/2010 | Sakai .................. C04B 35/6268 313/501 |
| 2010/0219741 A1 | 9/2010 | Kawasaki et al. |
| 2011/0234118 A1* | 9/2011 | Kim ...................... H01L 33/502 315/291 |
| 2012/0305844 A1 | 12/2012 | Emoto et al. |
| 2013/0300014 A1* | 11/2013 | Emoto ............... C09K 11/0883 264/21 |
| 2017/0037311 A1 | 2/2017 | Hosokawa et al. |
| 2017/0166810 A1 | 6/2017 | Morikawa et al. |

FOREIGN PATENT DOCUMENTS

| | | |
|---|---|---|
| JP | 2010241995 A | 10/2010 |
| JP | 2011174015 A | 9/2011 |
| JP | 2013173806 A | 9/2013 |
| JP | 2013173868 A | 9/2013 |
| JP | 2014-197635 * | 10/2014 |
| JP | 2014197635 A | 10/2014 |
| JP | 2017036430 A | 2/2017 |
| JP | 2017110206 A | 6/2017 |
| JP | 2017214551 A | 12/2017 |
| JP | 6572373 B1 | 9/2019 |
| WO | 2006093135 A1 | 9/2006 |
| WO | 2008062781 A1 | 5/2008 |
| WO | 2009048150 A1 | 4/2009 |
| WO | 2012042957 A1 | 4/2012 |
| WO | 2017104140 A1 | 6/2017 |

OTHER PUBLICATIONS

United States Patent and Trademark Office, Final Office Action, issued to U.S. Appl. No. 17/033,576 dated Nov. 26, 2021, 17 pages.
United States Patent and Trademark Office, Non-Final Office Action, issued to U.S. Appl. No. 17/033,576 dated Aug. 19, 2021, 8 pages.
Final Office Action, United States Patent and Trademark Office, issued to U.S. Appl. No. 17/033,576 dated Feb. 18, 2022, 14 pages.
Non-Final Office Action, United States Patent and Trademark Office, issued to U.S. Appl. No. 17/033,576 dated May 16, 2022, 5 pages.

* cited by examiner

METHOD FOR PRODUCING β-SIALON FLUORESCENT MATERIAL

CROSS-REFERENCE TO RELATED APPLICATIONS

This is a continuation-in-part of U.S. application Ser. No. 15/378,690, which claims priority under 35 USC 119 from Japanese patent Application No. 2015-244160 filed on Dec. 15, 2015 and Japanese Patent Application No. 2016-238927 filed on Dec. 9, 2016, the entire disclosures of which are incorporated by reference herein.

BACKGROUND

The present disclosure relates to a method for producing a β-sialon fluorescent material.

DESCRIPTION OF THE RELATED ART

Some types of light emitting devices can emit lights of various hues based on the principle of additive color mixing, using combinations of a light source and a fluorescent material which is excited by the light from the light source to emit light of a hue different from the hue of the light source. In particular, light emitting devices combining a light emitting diode (hereinafter, referred to as "LED") and a fluorescent material are used in backlights of liquid crystal displays, lighting systems and the like. The color reproduction range of a liquid crystal display can be enlarged, or the color rendering properties of a lighting system can be improved by constituting a light emitting device using a plurality of fluorescent materials, for example, fluorescent materials emitting green lights in combination with fluorescent materials emitting red lights.

As such a fluorescent material, for example, a fluorescent material including a sialon, a solid solution of silicon nitride, has been proposed and, as such a sialon, α-form sialon and β-form sialon having different crystal structures are conventionally known. A fluorescent material including, among these sialons, β-form sialon (hereinafter, also referred to as "β-sialon fluorescent material") is a green fluorescent material that is excited in a wide range of wavelengths from near ultraviolet light to blue light and emits light having a peak wavelength in the range of 520 nm to 560 nm.

The β-sialon fluorescent material is represented by, for example, the composition formula $Si_{6-z}Al_zO_zN_{8-z}:Eu$ ($0<z\leq4.2$). The β-sialon fluorescent material is obtained as a calcined product by mixing silicon nitride ($Si_3N_4$), aluminum nitride (AlN) and aluminum oxide ($Al_2O_3$) together with europium oxide ($Eu_2O_3$) as an activator in a prescribed molar ratio and calcining the mixture at about 2000° C. It has been disclosed that β-sialon fluorescent material with high emission intensity can be obtained by heat treating such a calcined product in an inert gas followed by acid treatment (see, for example, JP 2005-255895 A and JP 2011-174015 A). Other approaches that are known to provide higher emission intensity are to perform heat treatment at high temperature in two steps, and to use a β-sialon fluorescent material obtained by calcination as part of the raw materials (see, for example, JP 2007-326981 A and JP 2013-173868 A).

SUMMARY

A method for producing β-sialon fluorescent material includes providing a composition including silicon nitride that contains aluminium, an oxygen atom, and europium, heat treating the composition, contacting the heat treated composition with a basic substance, and washing the composition, which has been contacted with the basic substance, with an acidic liquid medium.

According to an embodiment of the present disclosure, the method can produce a β-sialon fluorescent material having excellent emission intensity.

DETAILED DESCRIPTION

From a practical standpoint, there has been a demand for higher emission intensity of β-sialon fluorescent material. In an embodiment of the present disclosure, an object is to provide a method for producing β-sialon fluorescent material having excellent emission intensity.

The present inventors have carried out extensive studies in light of the circumstances described above. As a result, the present inventors have found that high emission intensity is attained by heat treating a β-sialon fluorescent material and bringing the heat treated fluorescent material into contact with a basic substance.

Hereinbelow, embodiments of the present disclosure will be described. However, those embodiments below are only illustrative of some specific aspects such as production methods to give a concrete form to the technical ideas of the invention, and do not intend to limit the scope of the invention to such embodiments.

Relations such as those between the names of colors and the chromaticity coordinates, and those between the wavelengths of lights and the color names of monochromatic lights are in accordance with JIS Z8110.

In the specification, the term "step" comprehends not only an independent step but also a combination of steps which are not distinct from one another as long as such combined steps fulfill the desired purpose. Further, when a plurality of substances belong to any one component in a specific composition, the content of such a component in the composition means the total content of the plurality of substances present in the composition unless otherwise mentioned.

The average particle size is a volume median diameter (Dm), and is measured by a pore electrical resistance method based on the Coulter principle. Specifically, a particle size distribution is measured with a particle size distribution analyzer (for example, Multisizer manufactured by BECKMAN COULTER) and the volume median diameter (Dm) is determined as a particle size for 50% of the volume accumulation from smaller particles region.

Methods for Producing β-Sialon Fluorescent Material

A method for producing β-sialon fluorescent material includes providing a composition including silicon nitride that contains aluminium, an oxygen atom, and europium (hereinafter, also referred to as "provision step"), heat treating the composition (hereinafter, also referred to as "first heat treatment step"), and bringing the heat treated composition into contact with a basic substance (hereinafter, also referred to as "base treatment step").

The composition provided in the provision step is, for example, particles of a β-sialon fluorescent material itself. Upon heat treatment, unstable phases such as low crystalline moieties present in the fluorescent material particles are probably pyrolyzed to generate pyrolysates such as silicon. The subsequent contact of the fluorescent material particles containing such pyrolysates with a basic substance induces, for example, a reaction between the pyrolysates and the basic substance, and consequently the pyrolysates are probably converted into highly light-transmissive soluble compounds such as alkali metal silicates. This is probably the reason why emission intensity can be made high. The resultant soluble compounds can be easily dissolved and removed by, for example, cleaning with a liquid medium. Further, the contact with a basic substance will cause less damages to the particles of the β-sialon fluorescent material as compared to acid treatment with hydrofluoric acid, and it is assumed that such a characteristic is one of the reasons why emission intensity tends to be made high.

(Provision Step)

In the provision step, a composition including silicon nitride that contains aluminium, an oxygen atom, and europium is provided. The composition to be provided is, for example, a solid solution of silicon nitride therein aluminium, an oxygen atom, and europium having a composition represented by, for example, formula (I) below:

$$Si_{6-z}Al_zO_zN_{8-z}:Eu \qquad (I)$$

In formula (I), z satisfies 0<z≤4.2.

For example, the composition may be provided by selecting a desired composition from commercial products, or may be provided by producing a desired composition by heat treating a mixture of raw materials in accordance with a common method.

When the composition is produced in the provision step, the desired composition may be obtained by, for example, heat treating a mixture including an aluminum compound, a europium compound and a silicon nitride (hereinafter, also referred to as "raw mixture").

The raw mixture preferably includes at least one aluminum compound, at least one europium compound and at least one silicon nitride. Examples of the aluminum compounds include oxides, hydroxides, nitrides, oxynitrides, fluorides and chlorides containing aluminum. At least part of the aluminum compound may be replaced by elemental aluminum metal or an aluminum alloy. Specific examples of the aluminum compounds include aluminum nitride (AlN), aluminum oxide ($Al_2O_3$) and aluminum hydroxide (Al(OH)$_3$), and it is preferable to use at least one selected from the group consisting of these compounds. The aluminum compounds may be used singly, or two or more may be used in combination.

The average particle size of the aluminum compound used as a raw material is, for example, not less than 0.01 μm and not more than 20 μm, and preferably not less than 0.1 μm and not more than 10 μm. The purity of the aluminum compound is, for example, not less than 95 wt %, and preferably not less than 99 wt %.

Examples of the europium compounds include oxides, hydroxides, nitrides, oxynitrides, fluorides and chlorides containing europium. At least part of the europium compound may be replaced by elemental europium metal or a europium alloy. Specific examples of the europium compounds include europium oxide ($Eu_2O_3$), europium nitride (EuN) and europium fluoride ($EuF_3$), and it is preferable to use at least one selected from the group consisting of these compounds. The europium compounds may be used singly, or two or more may be used in combination.

The average particle size of the europium compound used as a raw material is, for example, not less than 0.01 μm and not more than 20 μm, and preferably not less than 0.1 μm and not more than 10.0 μm. The purity of the europium compound is, for example, not less than 95 wt %, and preferably not less than 99.5 wt %.

The silicon nitride is a silicon compound containing a nitrogen atom and a silicon atom, and may be silicon nitride containing an oxygen atom. When the silicon nitride contains an oxygen atom, the oxygen atom may be present as silicon oxide or as silicon oxynitride. The content of the oxygen atoms in the silicon nitride is, for example, less than 2 wt %, and preferably not more than 1.5 wt %. The content of the oxygen atoms is, for example, not less than 0.3 wt %, and preferably not less than 0.4 wt %. The purity of the silicon nitride is, for example, not less than 95 wt %, and preferably not less than 99 wt %.

The average particle size of the silicon nitride is, for example, not less than 0.01 μm and not more than 15 μm, and preferably not less than 0.1 μm and not more than 5.0 μm.

In the raw mixture, at least part of the silicon nitride may be replaced by elemental silicon or other silicon compound such as silicon oxide. That is, the raw mixture may contain elemental silicon or a silicon compound such as silicon oxide in addition to the silicon nitride, or may contain elemental silicon or a silicon compound such as silicon oxide in place of the silicon nitride. Examples of the silicon compounds include silicon oxides, silicon oxynitrides and silicates.

The ratio in which the aluminum compound, the europium compound and the silicon nitride are mixed together to form a raw mixture is as follows. For example, the molar ratio of the silicon atoms to the aluminum atoms in the raw mixture is (6−z):z (0<z≤4.2), and preferably 0.01<z<1.0. For example, the molar ratio of the silicon atoms plus aluminum atoms to the europium atoms is 6:0.001 to 6:0.05, and preferably 6:0.003 to 6:0.02.

Where necessary, the raw mixture may further contain a separately provided β-sialon fluorescent material. When the raw mixture contains a β-sialon fluorescent material, the content thereof may be, for example, not less than 1 wt % and not more than 50 wt % of the total weight of the raw mixture.

Where necessary, the raw mixture may contain a flux such as halide. The addition of a flux to the raw mixture further promotes the reaction among the raw materials and allows the solid phase reaction to proceed more uniformly so that the obtainable fluorescent material attains large particle sizes and higher emission characteristics. For example, the reason for this effect is probably because the temperature of the heat treatment in the provision step is substantially equal to or higher than the temperature at which the flux such as halide forms a liquid phase. Examples of the halides include chlorides and fluorides of rare earth metals, alkaline earth metals and alkali metals. The flux may be added as a make-up compound to control the elemental ratio of cations to the target ratio, or may be added after the raw materials have been added to the target ratio. When the raw mixture contains a flux, the content thereof is, for example, not more than 20 wt %, and preferably not more than 10 wt % of the raw mixture. The content is, for example, not less than 0.1 wt %.

The raw mixture may be obtained by weighing the desired starting compounds in the desired ratio and mixing the starting compounds together with use of a ball mill or the like, a mixer such as a Henschel mixer or a twin-cylinder mixer, or a mortar and a pestle. The mixing may be dry mixing or may be wet mixing involving a medium such as a solvent.

The temperature of the heat treatment of the raw mixture is, for example, not less than 1850° C. and not more than 2100° C., preferably not less than 1900° C. and not more than 2050° C., more preferably not less than 1920° C. and not more than 2050° C., and still more preferably not less than 2000° C. and not more than 2050° C. By performing the heat treatment at a temperature of 1850° C. or above, the formation of β-sialon fluorescent material takes place efficiently with europium being incorporated into the crystals in a facilitated manner, and the desired β-sialon fluorescent material may be obtained. At a heat treatment temperature of not more than 2100° C., the decomposition of the β-sialon fluorescent material formed tends to be prevented.

The atmosphere in which the raw mixture is heat treated preferably includes nitrogen gas, and more preferably is substantially a nitrogen gas atmosphere. When the atmosphere for the heat treatment of the raw mixture contains nitrogen gas, other gases such as hydrogen, oxygen and ammonia may be present in addition to the nitrogen gas. The content of the nitrogen gas in the atmosphere for the heat treatment of the raw mixture is, for example, not less than 90 vol %, and preferably not less than 95 vol %.

The pressure in the heat treatment of the raw mixture may be, for example, normal pressure to 200 MPa. To prevent the decomposition of the β-sialon fluorescent material formed, a higher pressure is more preferable, and a pressure of not less than 0.1 MPa and not more than 200 MPa is preferable, and a pressure of not less than 0.6 MPa and not more than 1.2 MPa is more preferable because of less restrictions on the industrial facility.

In the heat treatment, the raw mixture is heat treated by increasing the temperature from, for example, room temperature to a prescribed temperature. The time for increasing the temperature is, for example, not less than 1 hour and not more than 48 hours, preferably not less than 2 hours and not more than 24 hours, and more preferably not less than 3 hours and not more than 20 hours. If the time for increasing the temperature is 1 hour or longer, the fluorescent material particles tend to grow sufficiently and the incorporation of europium into the crystals of the fluorescent material particles tends to be facilitated.

In the heat treatment of the raw mixture, the mixture may be held at the prescribed temperature for a prescribed time. The holding time is, for example, not less than 1 hour and not more than 48 hours, preferably not less than 2 hours and not more than 30 hours, and more preferably not less than 3 hours and not more than 20 hours.

In the heat treatment of the raw mixture, the cooling time in which the material that has been heated to the prescribed temperature is cooled to room temperature is, for example, not less than 0.1 hour and not more than 20 hours, preferably not less than 1 hour and not more than 15 hours, and more preferably not less than 3 hours and not more than 12 hours. During the cooling from the prescribed temperature to room temperature, the material may be held at an appropriate temperature for an appropriate holding time. This holding time is controlled so that, for example, the emission intensity of the β-sialon fluorescent material will become higher. The holding time at a prescribed temperature during cooling is, for example, not less than 0.1 hour and not more than 20 hours, and preferably not less than 1 hour and not more than 10 hours. The temperature at which the material is held is, for example, not less than 1000° C. and less than 1800° C., and preferably not less than 1200° C. and not more than 1700° C.

The heat treatment of the raw mixture may be performed in, for example, a boron nitride crucible.

After the heat treatment of the raw mixture, the resultant composition may be subjected to a size regulation step which performs a combination of treatments such as disintegration, crushing and classification. The size regulation step gives a powder having a desired particle size. Specifically, after rough crushing, the composition may be crushed to a prescribed particle size with a usual crushing machine such as a ball mill, a jet mill or a vibration mill. Excessive crushing may cause defects on the surface of the fluorescent material particles and may result in a decrease in emission intensity. When the crushed grains are a mixture of various sizes, classification may be performed to regulate the particle size. The final adjustment of the particle size may be performed even after a downstream step such as the first heat treatment step or the base treatment step described later.

(First Heat Treatment Step)

In the first heat treatment step, the composition obtained in the provision step is heat treated to give a first heat-treated product. In the first heat treatment step, for example, unstable crystals, such as amorphous present in the β-sialon fluorescent material are probably decomposed at least partially. From the point of view of higher emission intensity, the atmosphere in the first heat treatment step is preferably a rare gas atmosphere or a vacuum, and is more preferably a rare gas atmosphere.

The rare gas atmosphere in the first heat treatment step includes at least one of rare gases such as helium, neon and argon, and preferably includes at least argon. The rare gas atmosphere may contain other gases such as oxygen, hydrogen and nitrogen in addition to the rare gas. The content of the rare gas present in the rare gas atmosphere is, for example, not less than 95 vol %, and preferably not less than 99 vol %.

When the first heat treatment step is performed in a rare gas atmosphere, the pressure may be, for example, in the range of normal pressure to 1 MPa, and preferably normal pressure to 0.2 MPa.

The first heat treatment step may be performed at a reduced pressure lower than normal pressure, and is particularly preferably performed in a vacuum. When the heat treatment is performed in a vacuum, the pressure is, for example, not more than 10 kPa, preferably not more than 1 kPa, and more preferably not more than 100 Pa. Here, the term "reduced pressure" or "vacuum" does not eliminate the possibility that any gas is present. Examples of the gases which may be present include rare gases, nitrogen, hydrogen and oxygen.

The heat treatment temperature in the first heat treatment step is, for example, not less than 1300° C. and not more than 1600° C., and preferably not less than 1350° C. and not more than 1500° C. The temperature in the first heat treatment step is preferably lower than the temperature of the heat treatment of the raw mixture. With this configuration, unstable crystals present in the fluorescent material particles are probably pyrolyzed more efficiently and the resultant fluorescent material particles will attain higher stability and higher crystallinity. The pyrolysates formed in the first heat treatment step include, for example, elemental silicon, and may be removed by downstream steps such as the base treatment step described later.

The heat treatment time in the first heat treatment step is, for example, not less than 1 hour and not more than 48 hours, and preferably not less than 2 hours and not more than 20 hours.

In the first heat treatment step, the composition is heat treated by increasing the temperature from, for example, room temperature to a prescribed temperature. The time for increasing the temperature is, for example, not less than 1 hour and not more than 48 hours, preferably not less than 2 hours and not more than 24 hours, and more preferably not less than 3 hours and not more than 20 hours.

In the first heat treatment step, the composition may be held at the prescribed temperature for a prescribed time. The holding time is, for example, not less than 1 hour and not more than 48 hours, preferably not less than 2 hours and not more than 30 hours, and more preferably not less than 3 hours and not more than 20 hours.

In the first heat treatment step, the cooling time in which the composition that has been heated to the prescribed temperature is cooled to room temperature is, for example, not less than 0.1 hour and not more than 20 hours, preferably not less than 1 hour and not more than 15 hours, and more preferably not less than 3 hours and not more than 12 hours. During the cooling from the prescribed temperature to room temperature, the composition may be held at an appropriate temperature for an appropriate holding time. This holding time is controlled so that, for example, the emission intensity of the β-sialon fluorescent material will become higher. The holding time at a prescribed temperature during cooling is, for example, not less than 0.5 hours and not more than 20 hours, and preferably not less than 1 hour and not more than 10 hours. The temperature at which the composition is held is, for example, not less than 800° C. and less than 1600° C., and preferably not less than 1000° C. and not more than 1400° C.

In the first heat treatment step, the composition obtained in the provision step may be heat treated in the presence of a europium compound. In this case, the heat treatment is preferably performed in a rare gas atmosphere. When the composition obtained in the provision step is heat treated in the presence of a europium compound in a rare gas atmosphere, a β-sialon fluorescent material having excellent emission intensity can be produced efficiently. For example, this effect is probably explained as follows. When the first heat treatment step is performed in the presence of a europium compound in a rare gas atmosphere, at least part of the europium compound is reduced to form a gas derived from the europium compound. It is probable that this gas is brought into contact with the composition provided in the provision step and consequently europium present in the composition is easily reduced to the divalent state. It is also probable that the gas resulting from the reduction of the europium compound is incorporated into the composition. The higher emission intensity is probably ascribed to a combination of these mechanisms.

Examples of the europium compounds used in the first heat treatment step include oxides, hydroxides, nitrides, oxynitrides, fluorides and chlorides containing europium. At least part of the europium compound may be replaced by elemental europium metal or a europium alloy. Specific examples of the europium compounds include europium oxide ($Eu_2O_3$), europium nitride (EuN) and europium fluoride ($EuF_3$), and it is preferable to use at least one selected from the group consisting of these compounds. Europium oxide is more preferable. The europium compounds may be used singly, or two or more may be used in combination.

The average particle size of the europium compound used in the first heat treatment step is, for example, not less than 0.01 μm and not more than 20 μm, and preferably not less than 0.1 μm and not more than 10.0 μm. The purity of the europium compound is, for example, not less than 95 wt %, and preferably not less than 99.5 wt %.

When a europium compound is used in the first heat treatment step, the weight ratio of the europium compound to the composition obtained in the provision step (100 wt %) is not less than 0.01 wt %, preferably not less than 0.05 wt %, and more preferably not less than 0.1 wt %. The weight ratio is not more than 50 wt %, preferably not more than 20 wt %, more preferably not more than 15 wt %, and still more preferably not more than 10 wt %.

When a europium compound is used in the first heat treatment step, the heat treatment is performed in such a manner that a gas generated from the europium compound can be brought into contact with the composition obtained in the provision step. For example, a mixture of the composition obtained in the provision step and the europium compound may be heat treated in a single container. Alternatively, the composition obtained in the provision step and the europium compound may be heat treated, without being mixed with each other, in a single container or separate containers. Still alternatively, part of the europium compound may be mixed together with the composition obtained in the provision step, and the resultant mixture and the rest of the compound may be heat treated, without being mixed with each other, in a single container or separate containers. When the composition obtained in the provision step and the europium compound are mixed together, the mixing is preferably effected as uniformly as possible.

The method for producing β-sialon fluorescent material may include a step in which the first heat-treated product resulting from the first heat treatment step is treated by disintegration, crushing and the like after the first heat treatment step. Such treatments as disintegration and crushing may be performed by the methods described hereinabove.

(Base Treatment Step)

In the base treatment step, the composition heat treated in the first heat treatment step (the first heat-treated product) is brought into contact with a basic substance to give a base-treated product. The contact with a basic substance makes it possible to achieve higher emission intensity probably because components present in the first heat-treated product that may be detrimental to emission characteristics such as pyrolysates are reacted with the basic substance and are converted into compounds having less impacts on emission characteristics.

Examples of the basic substances include alkali metal hydroxides, such as LiOH, NaOH, KOH, RbOH and CsOH; alkali metal carbonates, such as $Li_2CO_3$, $Na_2CO_3$, $K_2CO_3$, $Rb_2CO_3$ and $Cs_2CO_3$; hydroxides of elements of Group 2 of the Periodic Table, such as $Mg(OH)_2$, $Ca(OH)_2$, $Sr(OH)_2$ and $Ba(OH)_2$; ammonia ($NH_3$); hydrazine; ethylenediamine pyrocatechol (EDP); and quaternary ammonium compounds, such as tetramethylammonium hydroxide and tetraethylammonium hydroxide. Those basic substances which are soluble in water are preferable. More preferably, the basic substance includes at least one selected from the group consisting of LiOH, NaOH, KOH, RbOH, CsOH, $Li_2CO_3$, $Na_2CO_3$, $K_2CO_3$, $Rb_2CO_3$, $Cs_2CO_3$, ammonia ($NH_3$) and tetraethylammonium hydroxide, still more preferably includes at least one selected from the group consisting of LiOH, NaOH, KOH, RbOH, CsOH and $NH_3$, and particularly preferably includes at least NaOH or KOH.

The amount of the basic substance brought into contact with the first heat-treated product may be selected appropriately in accordance with factors such as the type of the basic substance. For example, the weight ratio of the basic substance to the first heat-treated product is not less than 0.5 wt %, preferably not less than 1 wt %, more preferably not less than 5 wt %, and still more preferably not less than 8 wt %. For example, the weight ratio is not more than 200 wt %, preferably not more than 100 wt %, and more preferably not more than 80 wt %. When the basic substance is used in a weight ratio of 0.5 wt % or above, the reaction thereof with components such as pyrolysates tends to proceed sufficiently. By controlling the ratio to not more than 200 wt %, adverse effects on the fluorescent material particles tend to be prevented.

For example, the base treatment step may be performed in an oxidizing atmosphere such as air or in an inert gas atmosphere such as nitrogen gas or argon gas. The inert gas concentration in the inert gas atmosphere is, for example, not less than 90 vol %, and preferably not less than 95 vol %. The pressure in the atmosphere in the base treatment step is, for example, not less than 10 Pa and not more than 1 MPa, and preferably not less than 100 Pa and not more than 0.2 MPa.

The temperature of the base treatment step is, for example, not less than 50° C. and not more than 650° C., preferably not less than 50° C. and not more than 500° C., and more preferably not less than 70° C. and not more than 400° C. Controlling the contact temperature to 50° C. or above increases the reactivity between components such as pyrolysates present in the first heat-treated product and the basic substance, and consequently productivity tends to be further enhanced. Limiting the contact temperature to not more than 650° C. tends to prevent adverse effects on the fluorescent material produced.

The base treatment step may adopt a plurality of temperature conditions. For example, the base treatment step may include contacting the first heat-treated product with the basic substance at a first temperature (also referred to as "first thermal base treatment") and performing the contact at a second temperature higher than the first temperature (also referred to as "second thermal base treatment"). Performing the first thermal base treatment and the second thermal base treatment tends to allow the reaction between the basic substance and components such as pyrolysates to proceed more efficiently and also tends to make it possible to prevent adverse effects on the fluorescent material particles. For example, the first temperature is not less than 50° C. and not more than 150° C., preferably not less than 60° C. and not more than 140° C., and more preferably not less than 60° C. and not more than 120° C. The second temperature is higher than the first temperature and is, for example, not less than 90° C. and not more than 650° C., preferably not less than 120° C. and not more than 500° C., and more preferably not less than 150° C. and not more than 400° C.

The contact time in the base treatment step may be selected appropriately in accordance with factors such as the type of the basic substance, the weight ratio and the contact temperature. For example, the contact time is not less than 0.1 hour and not more than 48 hours, and preferably not less than 0.5 hours and not more than 20 hours. In the case where the base treatment step includes the first thermal base treatment and the second thermal base treatment, the treatment time of the first thermal base treatment is, for example, not less than 0.1 hour and not more than 48 hours, and preferably not less than 0.5 hours and not more than 20 hours, and the treatment time of the second thermal base treatment is, for example, not less than 0.1 hour and not more than 24 hours, and preferably not less than 0.5 hours and not more than 12 hours.

The manner in which the first heat-treated product and the basic substance are contacted together preferably includes mixing the first heat-treated product with a solution of the basic substance. By using the basic substance in the form of a solution, the reaction between the first heat-treated product and the basic substance can be performed more uniformly. The solvent used to form the solution of the basic substance may be selected appropriately from usual solvents. Examples of the solvents include water; alcohols such as methanol, ethanol and isopropanol; and amines such as ethanolamine, triethanolamine and ethylenediamine. The solvents may be used singly, or two or more may be used in combination. In particular, the solvent preferably includes water.

The concentration of the solution of the basic substance may be selected appropriately in accordance with factors such as the type of the basic substance, and the solvent. The concentration of the solution of the basic substance may be, for example, not less than 0.1 wt % and not more than 80 wt %, and preferably not less than 1 wt % and not more than 50 wt %.

The base treatment step preferably includes mixing the first heat-treated product with a solution of the basic substance, and removing at least part of the solvent present in the solution. The removal of at least part of the solvent tends to further enhance the efficiency in the reaction between the basic substance and pyrolysates. When the solvent is removed from the mixture of the first heat-treated product and the solution of the basic substance, the rate of the removal of the solvent may be, for example, not less than 1 wt %, preferably not less than 10 wt %, and more preferably not less than 20 wt %.

Examples of the methods for removing the solvent include heat treatment and vacuum treatment. These methods may be used in combination. The solvent removal method is appropriately one that will not remove the basic substance in the solution together with the solvent, and preferably includes at least heat treatment. When the solvent is removed by heat treatment, the temperature is preferably similar to the first temperature described hereinabove.

The base treatment step preferably includes mixing the first heat-treated product with a solution of the basic substance, contacting the first heat-treated product with the basic substance at a first temperature (first thermal base treatment), and contacting the first heat-treated product from the first thermal base treatment with the basic substance at a second temperature higher than the first temperature (second thermal base treatment). More preferably, the first thermal base treatment includes removing at least part of the solvent present in the solution of the basic substance, and the second thermal base treatment includes heat treating the mixture of the first heat-treated product and the basic substance, which at least part of the solvent is removed, at the second temperature. By performing the treatment in such a manner that at least part of the solvent is removed at the first temperature and thereafter the mixture is heat treated at the second temperature, the reaction between components such as pyrolysates present in the first heat-treated product, and the basic substance tends to proceed more uniformly and efficiently.

The time for which the solvent removal is performed at the first temperature may be selected appropriately in accordance with factors such as the desired rate of solvent removal. The solvent removal time at the first temperature is similar to the treatment time of the first thermal base treatment, and the heat treatment time at the second temperature is similar to the treatment time of the second thermal base treatment. Here, the atmosphere in which the solvent removal is performed at the first temperature may be, for example, air or an inert gas atmosphere. On the other hand, the atmosphere of the heat treatment at the second temperature is preferably an inert gas atmosphere.

The base treatment step may include a step in which the base-treated product resulting from the base treatment is treated by disintegration, crushing and the like. Such treatments as disintegration and crushing may be performed by the methods described hereinabove.

(Washing Step)

The method for producing β-sialon fluorescent material may include washing the base-treated product from the base treatment step with a liquid medium (also referred to as "washing step"). Washing of the base-treated product with a liquid medium removes at least part of undesired components such as alkali metal silicates present in the base-treated product.

The method for producing β-sialon fluorescent material according to the present embodiment basically completes at the base treatment step. The washing step does not have a large role in the enhancement of the emission characteristics of the fluorescent material particles themselves after the base treatment step, and is aimed at removing undesired components such as trace amounts of alkali metal silicates generated during the base treatment step. The pyrolysates formed in the first heat treatment step such as elemental silicon are converted into compounds such as alkali metal silicates during the base treatment step. Such compounds themselves do not have a large involvement in emission characteristics. However, the washing step to remove such compounds formed in the base treatment step makes it possible to prevent adverse effects on materials such as silicone resins used in the manufacturing of light emitting devices including the fluorescent material particles. The washing step may remove, for example, at least a part of particles having a small average diameter and improve emission intensity. The washing step may remove at least a part of substance adhered to β-sialon fluorescent material particles and improve emission intensity. When the fluorescent material has a rod-like shape, the washing step may remove at least a part of spherical particles having low aspect ratio.

The washing step involves a liquid medium. The liquid medium may be selected appropriately from usual liquid medium in accordance with the purpose, as long as undesired components can be removed. Liquid medium of any properties may be used without limitation. Examples include water; neutral liquid medium such as alcohols, for example, ethanol and isopropanol; and acidic liquid medium such as hydrochloric acid and nitric acid, and it is preferable to use at least one selected from the group consisting of these medium. It is more preferable that the liquid medium include at least water. The use of acidic liquid medium containing water and an acidic substance such as hydrochloric acid, nitric acid and sulfuric acid sometimes makes it possible to remove undesired components more efficiently. Therefore, the washing step preferably contains at least one washing step which uses an acidic liquid medium. The concentration of the acidic substance in the acidic liquid medium may be, for example, not less than 0.01 wt % and not more than 35 wt %, and preferably not less than 0.1 wt % and not more than 35 wt %.

With respect to the washing method, washing may be performed, for example, by soaking the base-treated product into the liquid medium optionally followed by stirring, and separating the solid and the liquid. The solid liquid separation may be followed by drying treatment as required.

The temperature of the liquid medium used for washing is, for example, not less than 5° C. and not more than 95° C., and preferably not less than 25° C. and not more than 80° C. The washing time may be, for example, not less than 0.01 hour and not more than 48 hours, and preferably not less than 0.1 hour and not more than 20 hours.

The liquid medium used in the washing step may be a neutral solution, an acidic solution or an alkaline solution. Because the base-treated product has been treated with a base, it exhibits alkalinity when added to water. Thus, the washing step preferably includes washing with a neutral to acidic solution.

The washing step may be performed two or more times using the same or different liquid medium. For example, first washing may be performed using an acidic solution one or more times, and thereafter second washing may be performed using a neutral solution or an alkaline solution one or more times. In this manner, for example, basic compounds or acidic compounds attached to the surface of the β-sialon fluorescent material may be efficiently removed by the first washing. The second washing may contain washing using water.

(Second Heat Treatment Step)

The method for producing β-sialon fluorescent material may include heat treating the composition provided in the provision step in a nitrogen atmosphere before the first heat treatment step. (This treatment will be also referred to as "second heat treatment step".) The addition of the second heat treatment step ensures that the obtainable β-sialon fluorescent material will attain higher emission intensity. For example, some of the reasons as to why the second heat treatment step provides an increase in emission intensity are because the crystallinity is enhanced, and because poor crystal growth particles present in the composition obtained in the provision step are incorporated into large particles with the result that the particles grow to larger sizes.

The heat treatment temperature in the second heat treatment step is, for example, not less than 1800° C. and not more than 2100. ° C., preferably not less than 1850° C. and not more than 2040° C., and more preferably not less than 1900° C. and less than 2040° C.

The atmosphere in the second heat treatment step is a nitrogen atmosphere including at least nitrogen gas, and is preferably a nitrogen atmosphere substantially consisting of nitrogen gas. The nitrogen atmosphere in the second heat treatment step may contain other gases such as hydrogen, oxygen and ammonia in addition to nitrogen gas. The content of the nitrogen gas in the nitrogen atmosphere in the second heat treatment step is, for example, not less than 90 vol %, and preferably not less than 95 vol %.

The pressure in the second heat treatment step is for example, the pressure may be normal pressure to 200 MPa. To prevent the decomposition of the β-sialon fluorescent material formed, a higher pressure is preferable, and a pressure of not less than 0.1 MPa and not more than 200 MPa is preferable, and a pressure of not less than 0.6 MPa and not more than 1.2 MPa is more preferable because of less restrictions on the industrial facility.

In the second heat treatment step, the composition is heat treated by increasing the temperature from, for example, room temperature to a prescribed temperature. The time for increasing the temperature is, for example, not less than 1 hour and not more than 48 hours, preferably not less than 2 hours and not more than 24 hours, and more preferably not less than 3 hours and not more than 20 hours.

In the second heat treatment step, the composition may be held at the prescribed temperature for a prescribed time. The holding time is, for example, not less than 1 hour and not more than 48 hours, preferably not less than 2 hours and not more than 30 hours, and more preferably not less than 3 hours and not more than 20 hours.

In the second heat treatment step, the cooling time in which the composition that has been heated to the prescribed temperature is cooled to room temperature is, for example, not less than 0.1 hour and not more than 20 hours, preferably not less than 1 hour and not more than 15 hours, and more preferably not less than 3 hours and not more than 12 hours. During the cooling from the prescribed temperature to room temperature, the composition may be held at an appropriate temperature for an appropriate holding time. This holding time is controlled so that, for example, the emission intensity of the β-sialon fluorescent material will become higher. The holding time at a prescribed temperature during cooling is, for example, not less than 0.1 hour and not more than 20 hours, and preferably not less than 1 hour and not more than 10 hours. The temperature at which the composition is held is, for example, not less than 1000° C. and less than 1800° C., and preferably not less than 1200° C. and not more than 1700° C.

When the method for producing β-sialon fluorescent material includes the second heat treatment step, the composition resulting from the second heat treatment step is subjected to the first heat treatment step. In the method for producing β-sialon fluorescent material, further, the second heat treatment step may be performed two or more times. In this case, the composition resulting from the final second heat treatment step is subjected to the first heat treatment step.

(Third Heat Treatment Step)

When the method for producing β-sialon fluorescent material includes the washing step, the method may include heat treating the base-treated product after the washing step. (This treatment will be also referred to as "third heat treatment step".) The addition of the third heat treatment step probably enhances the crystallinity of the fluorescent material particles, and thus ensures that the obtainable β-sialon fluorescent material will attain higher emission intensity. The heat treatment temperature in the third heat treatment step is, for example, not less than 1000° C. and not more than 1800° C., preferably not less than 1100° C. and not more than 1700° C., and more preferably not less than 1150° C. and less than 1650° C.

The atmosphere in the third heat treatment step is not particularly limited. The atmosphere in the third heat treatment step is preferably a nitrogen-containing atmosphere. It is more preferable that the atmosphere be substantially nitrogen atmosphere. When the atmosphere in the third heat treatment step contains nitrogen, other gases such as hydrogen, oxygen and ammonia may be present in addition to nitrogen. The content of nitrogen in the atmosphere in the third heat treatment step is, for example, not less than 90 vol %, and preferably not less than 95 vol %.

The pressure in the third heat treatment step is for example, normal pressure to 200 MPa. To prevent the decomposition of the β-sialon fluorescent material formed, a higher pressure is preferable, and a pressure of not less than 0.1 MPa and not more than 200 MPa is preferable, and a pressure of not less than 0.6 MPa and not more than 1.2 MPa is more preferable because of less restrictions on the industrial facility.

In the third heat treatment step, the base-treated product is heat treated by increasing the temperature from, for example, room temperature to a prescribed temperature. The time for increasing the temperature is, for example, not less than 1 hour and not more than 48 hours, preferably not less than 2 hours and not more than 24 hours, and more preferably not less than 3 hours and not more than 20 hours.

In the third heat treatment step, the base-treated product may be held at the prescribed temperature for a prescribed time. The holding time is, for example, not less than 1 hour and not more than 48 hours, preferably not less than 2 hours and not more than 30 hours, and more preferably not less than 3 hours and not more than 20 hours.

In the third heat treatment step, the cooling time in which the base-treated product that has been heated to the prescribed temperature is cooled to room temperature is, for example, not less than 0.1 hour and not more than 20 hours, preferably not less than 1 hour and not more than 15 hours, and more preferably not less than 3 hours and not more than 12 hours. During the cooling from the prescribed temperature to room temperature, the base-treated product may be held at an appropriate temperature for an appropriate holding time. This holding time is controlled so that, for example, the emission intensity of the β-sialon fluorescent material will become higher.

β-Sialon Fluorescent Material

The β-sialon fluorescent material of the present embodiment is obtained by the specific production method and, as a result, exhibits high emission intensity. For example, the emission intensity can be made higher by 5% or above, sometimes by 10% or above, and further by 50% or above, as compared to the production without the base treatment.

The β-sialon fluorescent material of the present embodiment has a composition represented by the formula described hereinabove, and may further contain trace amounts of alkali metal elements. When the β-sialon fluorescent material contains alkali metal elements, the content thereof is, for example, not less than 0.1 ppm and not more than 1000 ppm, and preferably not less than 0.1 ppm and not more than 100 ppm.

The β-sialon fluorescent material of the present embodiment absorbs light in the region from ultraviolet light to short-wavelength light of visible light, and emits light having a peak wavelength longer than the emission peak wavelength of the excitation light. The short-wavelength light of visible light is mainly in the blue light region. Specifically, the fluorescent material is excited by light from an excitation light source having an emission peak wavelength in the range of 250 nm to 480 nm inclusive, and emits fluorescent light having an emission peak wavelength in the range of 520 nm to 560 nm inclusive. By the use of an excitation light source having a peak wavelength in the range of 250 nm to 480 nm, higher emission efficiency of the β-sialon fluorescent material can be achieved, because of relatively high intensity in the excitation spectrum of the β-sialon fluorescent material in that range of the wavelength. In particular, it is preferable to use an excitation light source having an emission peak wavelength of 350 nm to 480 nm inclusive, and it is more preferable to use an excitation light source having an emission peak wavelength of 420 nm to 470 nm inclusive.

Further, the β-sialon fluorescent material of the present embodiment has high crystallinity. Glass (amorphous), for example, has an irregular structure and is low in crystallinity. Thus, the proportions of components in the fluorescent material are variable and problems such as uneven chromaticity tend to be caused unless the reaction conditions in the production steps can be controlled to be strictly constant. In contrast, the β-sialon fluorescent material according to the present embodiment is a powder or grains which have high crystallinity in at least part of its structure, and this characteristic tends to allow for easy production and processing of the fluorescent material. Further, the β-sialon fluorescent material can be easily dispersed into an organic medium uniformly, which makes it easy to prepare products such as luminescent plastics and polymer thin film materials. Specifically, for example, not less than 50 wt %, and more preferably not less than 80 wt % of the structure of the β-sialon fluorescent material has crystallinity. This ratio indicates the proportion of luminescent crystal phases, and emission of light which can endure practical use can be advantageously achieved when such crystal phases represent not less than 50 wt % of the structure. Thus, the higher the proportion of the crystal phases, the higher the emission efficiency and, hence, the higher the emission intensity can be made and the more easy to process the fluorescent material can be made.

As for the average particle size of the β-sialon fluorescent material of the present embodiment, the volume median diameter (Dm) measured based on the Coulter principle is, for example, not less than 4 μm and not more than 40 μm, and preferably not less than 8 μm and not more than 30 μm. It is preferable that the β-sialon fluorescent material contain particles having this average particle size with a high frequency. That is, it is preferable that the particle size distribution be in narrow range. The use of a β-sialon fluorescent material having a small half width of the particle size distribution makes it possible to manufacture a light emitting device having enhanced color homogeneities and good color tones. Further, the larger the average particle size, the higher the light absorption rate and the higher the emission efficiency. Thus, the use of a fluorescent material having the above excellent optical characteristics and a large average particle size in the light emitting devices enhances the emission efficiency of light emitting devices.

EXAMPLES

Example 1

Provision Step

As starting compounds, silicon nitride ($Si_3N_4$), aluminum nitride (AlN) and europium oxide ($Eu_2O_3$) were weighed in a molar ratio Si:Al:Eu=5.88:0.12:0.01, and were mixed together to give a first raw mixture. The raw mixture was packed into a boron nitride crucible and was heat treated in a nitrogen atmosphere at a pressure of about 0.92 MPa (gauge pressure) and 2030° C. for 10 hours. A β-sialon fluorescent material was thus obtained.

Next, the β-sialon fluorescent material obtained by the above heat treatment was mixed together with silicon nitride, aluminum nitride and europium oxide to give a second raw mixture. Here, the Si:Al:Eu ratio was the same as above, and the content of the β-sialon fluorescent material was 20 wt % of the total weight of the second raw mixture. The second raw mixture was heat treated in such a manner that the mixture was calcined in a nitrogen atmosphere at a pressure of about 0.92 MPa (gauge pressure) and 1970° C. for 10 hours and was cooled to room temperature while being held at a temperature of 1500° C. for 5 hours during the course of cooling. A composition represented by the formula (I) described hereinabove was thus obtained.

Second Heat Treatment Step

The composition obtained was crushed, packed into a boron nitride crucible, and heat treated in a nitrogen atmosphere at a pressure of about 0.92 MPa (gauge pressure) in such a manner that the temperature was increased to 2030° C. in 10 hours and held at a temperature of 2030° C. for 10 hours, and the composition was cooled to room temperature while being held at a temperature of 1500° C. for 5 hours during the course of cooling. By this second heat treatment step, a heat-treated product was obtained.

First Heat Treatment Step

The heat-treated product obtained by the second heat treatment step was mixed together with 0.5 wt % relative to the heat-treated product, of europium oxide. The resultant mixture was heat treated in an argon atmosphere at normal pressure in such a manner that the mixture was heated at a temperature of 1400° C. for 5 hours and was cooled to room temperature while being held at a temperature of 1100° C. for 5 hours during the course of cooling. The heat treatment was followed by crushing and dispersion treatments. A first heat-treated product was thus obtained.

Base Treatment Step

The first heat-treated product was mixed with a solution containing, relative to the first heat-treated product, 10 wt % of sodium hydroxide and 90 wt % of pure water. Thereafter, heat treatment was performed at 70° C. for 3 hours in the air to remove water. A base-treated product was thus obtained.

Washing Step

The base-treated product was stirred in 1000 wt % of pure water (10 times as much as) relative to the base-treated product. Thereafter, the pure water was changed several times. The product that had been thus washed was subjected to solid liquid separation and drying treatment. A fluorescent material 1 was thus obtained.

Example 2

A fluorescent material 2 was obtained by performing the synthesis under the same conditions as in Example 1, except that the amounts of sodium hydroxide and pure water in the base treatment step were changed to 1 wt % and 99 wt %, respectively.

Example 3

A fluorescent material 3 was obtained by performing the synthesis under the same conditions as in Example 1, except that the amounts of sodium hydroxide and pure water in the base treatment step were changed to 5 wt % and 95 wt %, respectively.

Example 4

A fluorescent material 4 was obtained by performing the synthesis under the same conditions as in Example 1, except that the amounts of sodium hydroxide and pure water in the base treatment step were changed to 20 wt % and 80 wt %, respectively.

Example 5

A fluorescent material 5 was obtained by performing the synthesis under the same conditions as in Example 1, except that the amounts of sodium hydroxide and pure water in the base treatment step were changed to 50 wt % and 50 wt %, respectively.

Example 6

A fluorescent material 6 was obtained by performing the synthesis under the same conditions as in Example 2, except that the base treatment step was carried out by performing first thermal base treatment at 70° C. for 3 hours similarly to Example 2 and further performing second thermal base treatment at 200° C. for 2 hours in a nitrogen atmosphere.

Example 7

A fluorescent material 7 was obtained by performing the synthesis under the same conditions as in Example 3, except that the base treatment step was carried out by performing first thermal base treatment at 70° C. for 3 hours similarly to Example 3 and further performing second thermal base treatment at 200° C. for 2 hours in a nitrogen atmosphere.

Example 8

A fluorescent material 8 was obtained by performing the synthesis under the same conditions as in Example 1, except that the base treatment step was carried out by performing first thermal base treatment at 70° C. for 3 hours similarly to Example 1 and further performing second thermal base treatment at 200° C. for 2 hours in a nitrogen atmosphere.

Example 9

A fluorescent material 9 was obtained by performing the synthesis under the same conditions as in Example 4, except that the base treatment step was carried out by performing first thermal base treatment at 70° C. for 3 hours similarly to Example 4 and further performing second thermal base treatment at 200° C. for 2 hours in a nitrogen atmosphere.

Example 10

A fluorescent material 10 was obtained by performing the synthesis under the same conditions as in Example 5, except that the base treatment step was carried out by performing first thermal base treatment at 70° C. for 3 hours similarly to Example 5 and further performing second thermal base treatment at 200° C. for 2 hours in a nitrogen atmosphere.

Example 11

A fluorescent material 11 was obtained by performing the synthesis under the same conditions as in Example 6, except that the amounts of sodium hydroxide and pure water in the base treatment step were changed to 10 wt % and 70 wt %, respectively.

Example 12

A fluorescent material 12 was obtained by performing the synthesis under the same conditions as in Example 6, except that the basic substance in the base treatment step was changed to 0.5 wt % of potassium hydroxide.

Example 13

A fluorescent material 13 was obtained by performing the synthesis under the same conditions as in Example 6, except that the basic substance in the base treatment step was changed to 1 wt % of potassium hydroxide.

Example 14

A fluorescent material 14 was obtained by performing the synthesis under the same conditions as in Example 7, except that the basic substance in the base treatment step was changed to 5 wt % of potassium hydroxide.

Example 15

A fluorescent material 15 was obtained by performing the synthesis under the same conditions as in Example 8, except that the basic substance in the base treatment step was changed to 10 wt % of potassium hydroxide.

Example 16

A fluorescent material 16 was obtained by performing the synthesis under the same conditions as in Example 9, except that the basic substance in the base treatment step was changed to 20 wt % of potassium hydroxide.

Example 17

A fluorescent material 17 was obtained by performing the synthesis under the same conditions as in Example 8, except that the temperature in the second thermal base treatment was changed to 100° C.

Example 18

A fluorescent material 18 was obtained by performing the synthesis under the same conditions as in Example 8, except that the temperature in the second thermal base treatment was changed to 150° C.

Example 19

A fluorescent material 19 was obtained by performing the synthesis under the same conditions as in Example 8, except that the temperature in the second thermal base treatment was changed to 300° C.

Example 20

A fluorescent material 20 was obtained by performing the synthesis under the same conditions as in Example 8, except that the temperature in the second thermal base treatment was changed to 400° C.

Example 21

A fluorescent material 21 was obtained by performing the synthesis under the same conditions as in Example 8, except that the temperature in the second thermal base treatment was changed to 600° C.

Example 22

A fluorescent material 22 was obtained by performing the synthesis under the same conditions as in Example 8, except that the time for which the second thermal base treatment was performed was changed to 0.5 hours.

Example 23

A fluorescent material 23 was obtained by performing the synthesis under the same conditions as in Example 8, except that the time for which the second thermal base treatment was performed was changed to 1 hour.

Example 24

A fluorescent material 24 was obtained by performing the synthesis under the same conditions as in Example 8, except that the time for which the second thermal base treatment was performed was changed to 4 hours.

Example 25

A fluorescent material 25 was obtained by performing the synthesis under the same conditions as in Example 8, except that the time for which the second thermal base treatment was performed was changed to 8 hours.

Example 26

A fluorescent material 26 was obtained by performing the synthesis under the same conditions as in Example 8, except that the basic substance in the base treatment step was changed to 10 wt % of lithium hydroxide.

Example 27

A fluorescent material 27 was obtained by performing the synthesis under the same conditions as in Example 8, except that the basic substance in the base treatment step was changed to 10 wt % of rubidium hydroxide.

Example 28

A fluorescent material 28 was obtained by performing the synthesis under the same conditions as in Example 8, except that the basic substance in the base treatment step was changed to 10 wt % of cesium hydroxide.

Example 29

A fluorescent material 29 was obtained by performing the synthesis under the same conditions as in Example 12, except that the base treatment step involved 8.5 wt % of potassium hydroxide, 1.5 wt % of pure water and 90 wt % of ethanol, and the temperature and time in the first thermal base treatment were changed to 100° C. and 1 hour.

Comparative Example 1

A fluorescent material C1 was obtained by performing the synthesis under the same conditions as in Example 1, except that the base treatment step was not carried out.

Comparative Example 2

A fluorescent material C2 was obtained by performing the synthesis under the same conditions as in Example 11, except that the sodium hydroxide in the base treatment step was replaced by sodium nitrate.

Example 30

A fluorescent material 30 was obtained by performing the synthesis under the same conditions as in Example 1, except that in the provision step, the content of the β-sialon fluorescent material was changed to 10 wt % of the total weight of the second raw mixture and, in the base treatment step, the obtained first heat-treated product was mixed with a solution containing, relative to the first heat-treated product, 18 wt % of sodium hydroxide and 82 wt % of pure water and heat treatment was performed at 105° C. for 16 hours in the air to remove water, thereby obtaining a base-treated product.

Example 31

A fluorescent material 31 was obtained by performing the synthesis under the same conditions as in Example 30, except that in the base treatment step, the obtained first heat-treated product was mixed with a solution containing, relative to the first heat-treated product, 20 wt % of sodium carbonate and 100 wt % of pure water.

Example 32

A fluorescent material 32 was obtained by performing the synthesis under the same conditions as in Example 30, except that in the base treatment step, the obtained first heat-treated product was mixed with a solution containing, relative to the first heat-treated product, 20 wt % of potassium carbonate and 100 wt % of pure water.

Example 33

A fluorescent material 33 was obtained by performing the synthesis under the same conditions as in Example 30, except that after the first base treatment step was conducted at 70° C. for 3 hours, the second base treatment step was conducted at 300° C. for 2 hours under nitrogen atmosphere.

Example 34

A fluorescent material 34 was obtained by performing the synthesis under the same conditions as in Example 31, except that after the first base treatment step was conducted at 70° C. for 3 hours, the second base treatment step was conducted at 300° C. for 2 hours under nitrogen atmosphere.

Example 35

A fluorescent material 35 was obtained by performing the synthesis under the same conditions as in Example 32, except that after the first base treatment step was conducted at 70° C. for 3 hours, the second base treatment step was conducted at 300° C. for 2 hours under nitrogen atmosphere.

Comparative Example 3

A fluorescent material C3 was obtained by performing the synthesis under the same conditions as in Example 30, except that the base treatment step was not carried out.

(Evaluations)

The β-sialon fluorescent material obtained were analyzed by a pore electrical resistance method (an electrical sensing zone method) based on the Coulter principle using a particle size distribution analyzer (Multisizer manufactured by BECKMAN COULTER) to determine the average particle size (Dm, median diameter).

The emission characteristics of the fluorescent materials were measured with spectrofluorophotometer QE-2000 (manufactured by OTSUKA ELECTRONICS Co., LTD.). Specifically, emission spectra were recorded using 450 nm wavelength excitation light, and the relative emission intensity (%) and the emission peak wavelength (nm) at the peak top of the emission spectra were measured. Here, the relative emission intensity was calculated relative to the intensity of the fluorescent material C1 of Comparative Example 1 with respect to Examples 1 to 29 and Comparative Example 2 and relative to the intensity of the fluorescent material C3 of Comparative Example 3 with respect to Examples 30 to 35. All the emission peak wavelengths were near 538 nm.

The evaluation results are described in Table 1 below.

rescent material obtained in Comparative Example 1 and Example 1, respectively. From FIG. 2 and FIG. 3, the β-sialon fluorescent material have substantially the same particle shapes and we find no change is caused. This probably indicates that the base treatment step does not cause changes in particle size or shape. That is, the treatment with the basic substance can remove undesired components such as decomposition products formed during the first heat

TABLE 1

| | Additive | First thermal base treatment | Second thermal base treatment | Amount of additive (wt %) | Amount of water (wt %) | Amount of ethanol (wt %) | Average particle size Dm (μm) | Relative emission intensity (%) | Emission peak wavelength (nm) |
|---|---|---|---|---|---|---|---|---|---|
| Comparative Example 1 | — | — | — | — | — | — | 12.0 | 100.0 | 536 |
| Example 2 | NaOH | 70° C., 3 hr, air | — | 1 | 99 | 0 | 13.0 | 115.3 | 537 |
| Example 3 | | | | 5 | 95 | | 13.4 | 114.5 | 538 |
| Example 1 | | | | 10 | 90 | | 12.5 | 116.5 | 538 |
| Example 4 | | | | 20 | 80 | | 12.3 | 137.8 | 537 |
| Example 5 | | | | 50 | 50 | | 13.4 | 157.0 | 538 |
| Example 6 | | | 200° C., 2 hr, nitrogen | 1 | 99 | 0 | 12.7 | 118.4 | 538 |
| Example 7 | | | | 5 | 95 | | 12.6 | 162.8 | 539 |
| Example 8 | | | | 10 | 90 | | 13.0 | 169.4 | 538 |
| Example 9 | | | | 20 | 80 | | 12.2 | 165.5 | 540 |
| Example 10 | | | | 50 | 50 | | 12.5 | 165.2 | 539 |
| Example 11 | | | | 10 | 70 | | 12.5 | 166.2 | 539 |
| Comparative Example 2 | NaNO₃ | | | 10 | 70 | | 12.1 | 99.9 | 536 |
| Example 12 | KOH | 70° C., 3 hr, air | 200° C., 2 hr, nitrogen | 0.5 | 99.5 | 0 | 12.5 | 112.2 | 536 |
| Example 13 | | | | 1 | 99 | | 12.3 | 112.4 | 537 |
| Example 14 | | | | 5 | 95 | | 13.1 | 166.6 | 539 |
| Example 15 | | | | 10 | 90 | | 13.4 | 166.9 | 539 |
| Example 16 | | | | 20 | 80 | | 15.6 | 168.4 | 539 |
| Example 17 | NaOH | 70° C., 3 hr, air | 100° C., 2 hr, nitrogen | 10 | 90 | 0 | 13.3 | 161.3 | 537 |
| Example 18 | | | 150° C., 2 hr, nitrogen | | | | 14.2 | 163.8 | 539 |
| Example 19 | | | 300° C., 2 hr, nitrogen | | | | 14.4 | 166.2 | 539 |
| Example 20 | | | 400° C., 2 hr, nitrogen | | | | 16.3 | 162.8 | 539 |
| Example 21 | | | 600° C., 2 hr, nitrogen | | | | 16.4 | 159.8 | 540 |
| Example 22 | NaOH | 70° C., 3 hr, air | 200° C., 0.5 hr, nitrogen | 10 | 90 | 0 | 12.4 | 162.0 | 539 |
| Example 23 | | | 200° C., 1 hr, nitrogen | | | | 12.7 | 165.1 | 539 |
| Example 24 | | | 200° C., 4 hr, nitrogen | | | | 12.7 | 164.8 | 539 |
| Example 25 | | | 200° C., 8 hr, nitrogen | | | | 13.2 | 165.0 | 539 |
| Example 26 | LiOH | 70° C., 3 hr, air | 200° C., 2 hr, nitrogen | 10 | 90 | 0 | 12.3 | 159.7 | 539 |
| Example 27 | RbOH | | | | | | 12.6 | 164.7 | 539 |
| Example 28 | CsOH | | | | | | 12.4 | 167.1 | 538 |
| Example 29 | KOH | 100° C., 1 hr, air | 200° C., 2 hr, nitrogen | 8.5 | 1.5 | 90 | 13.2 | 167.9 | 539 |
| Example 30 | NaOH | 105° C., 16 hr, air | — | 18 | 82 | 0 | 15.1 | 250.4 | 540 |
| Example 31 | Na₂CO₃ | | | 20 | 100 | | 16.4 | 180.0 | 537 |
| Example 32 | K₂CO₃ | | | 20 | 100 | | 15.9 | 176.2 | 537 |
| Example 33 | NaOH | 70° C., 3 hr, air | 300° C., 2 hr, nitrogen | 18 | 82 | 0 | 16.7 | 253.7 | 540 |
| Example 34 | Na₂CO₃ | | | 20 | 100 | | 17.1 | 228.7 | 539 |
| Example 35 | K₂CO₃ | | | 20 | 100 | | 18.2 | 238.8 | 539 |
| Comparative Example 3 | — | — | — | — | — | — | 16.9 | 100.0 | 537 |

Figure 1:
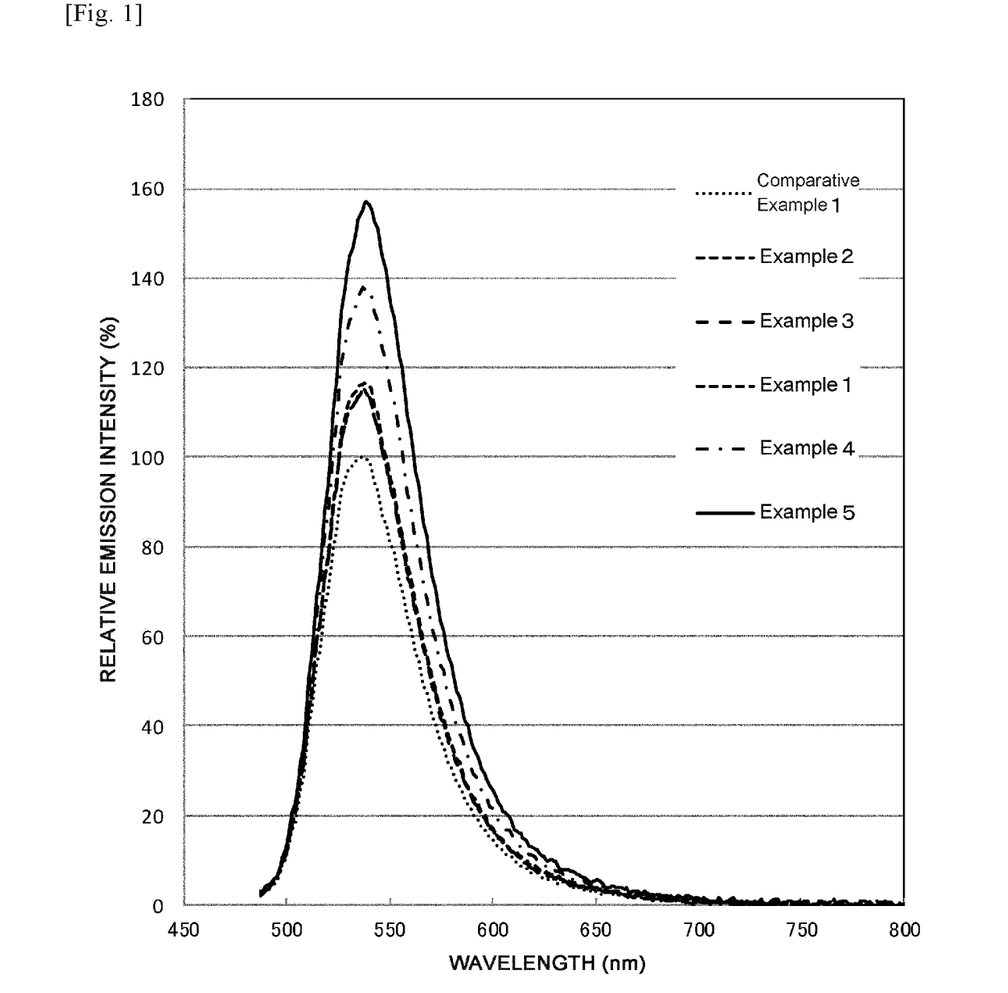
FIG. 1 shows emission spectra illustrating the relative emission intensities of β-sialon fluorescent material according to some embodiments of the present disclosure, plotted against wavelengths.

FIG. 1 illustrates the emission spectra of the β-sialon fluorescent material obtained in Examples 1 to 5 and Comparative Example 1, the spectra being normalized based on the maximum emission intensity of Comparative Example 1. As also shown in Table 1, the β-sialon fluorescent material 1 to 29 have been demonstrated to have high relative emission intensity.

Figure 2:
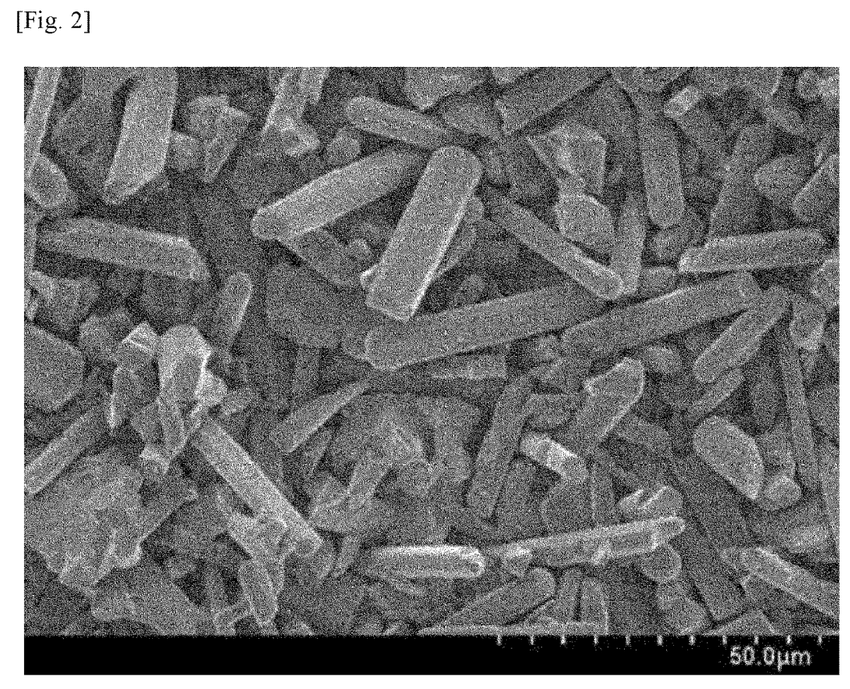
FIG. 2 is an exemplary SEM image of a β-sialon fluorescent material of a comparative example.
Figure 3:
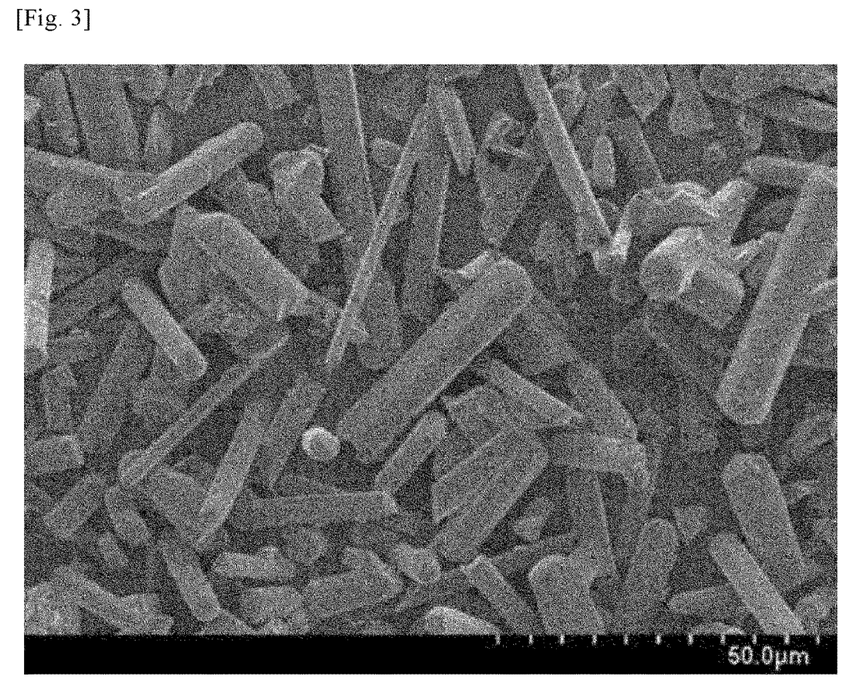
FIG. 3 is an exemplary SEM image of a β-sialon fluorescent material according to an embodiment of the present disclosure.

FIG. 2 and FIG. 3 are electron micrographs (SEM images) illustrating the shapes of the particles of the β-sialon fluotreatment step without causing a change in the shape of the β-sialon fluorescent material itself, and thereby allows the β-sialon fluorescent material to attain higher emission intensity.

Examples 6 to 11 involved the second thermal base treatment at a higher temperature in addition to the first thermal base treatment, and consequently attained further improvements in relative emission intensity as compared to Examples 1 to 5 in which the base treatment step included the first thermal base treatment alone. The reason for this result is probably the accelerated reaction between the basic substance and the heat-treated β-sialon by the thermal base treatment at a higher temperature.

Examples 12 to 16 have shown that the relative emission intensity is improved even when potassium hydroxide is used as the basic substance, similarly to when sodium hydroxide is used.

In Examples 17 to 21 in which the second thermal base treatment was performed at various temperatures, it has been shown that the relative emission intensity was particularly improved when the temperature of the second thermal base treatment was 300° C. in Example 19.

Examples 22 to 25 in which the second thermal base treatment was performed for various lengths of time have shown that the relative emission intensity was particularly improved when the treatment time was 1 hour or longer.

In Examples 26 to 28 which involved various basic substances, it has been shown that a basic substance considered to have higher reactivity provided a higher improvement in relative emission intensity.

Example 29 has shown that the solvent is not limited to water and the relative emission intensity is improved also with an alcohol.

In each of Example 30 to 35, the amount of the β-sialon fluorescent material in the second raw mixture was ½ of that in Example 1, and the average particle size was larger than that in Example 1. In some of Example 30 to 35, the relative emission intensity was approximately twice as high as that in Example 1. In general, the emission intensity is assumed to become higher as the particles become larger. However, during the process of growth of the particles to larger ones, the possibility of occurrence of amorphous is assumed to become higher. These facts show that the effect of the base treatment to bring higher emission intensity is particularly remarkable in the β-sialon fluorescent material with higher possibility of occurrence of amorphous due to larger average particle size.

The β-sialon fluorescent material obtained by the production method according to the above-described embodiment may be suitably used in applications such as illumination light sources with excellent emission characteristics using, in particular, blue light-emitting diodes or ultraviolet light-emitting diodes as excitation light sources, LED displays, backlight sources, traffic lights, illumination switches, various sensors and various indicators.

As described above, it should be obvious that various other embodiments are possible without departing the spirit and scope of the present invention. Accordingly, the scope and spirit of the present invention should be limited only by the following claims.

All publications, patent applications, and technical standards mentioned in this specification are herein incorporated by reference to the same extent as if each individual publication, patent application, or technical standard was specifically and individually indicated to be incorporated by reference.

Although the present disclosure has been described with reference to several exemplary embodiments, it shall be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

What is claimed is:

1. A method for producing a β-sialon fluorescent material, the method comprising:
    providing a composition comprising silicon nitride that contains aluminium, an oxygen atom, and europium;
    heat treating the composition;
    contacting the heat-treated composition with a basic substance,
    washing the composition, which has been contacted with the basic substance, to remove a basic compound attached to a surface of the β-sialon fluorescent material, and
    contacting the heat-treated composition with an acidic liquid medium,
    wherein the contacting of the heat-treated composition with the basic substance takes place at a temperature of not less than 50° C. and not more than 650° C.,
    wherein the contacting of the heat-treated composition with the basic substance comprises a contact in air at a first temperature and a contact in an inert gas atmosphere at a second temperature higher than the first temperature,
    wherein a contact time for the contacting of the heat-treated composition with the basic substance at the first temperature is not less than 0.1 hour and not more than 48 hours, and wherein a contact time for the contacting of the heat-treated composition with the basic substance at the second temperature is not less than 0.1 hour and not more than 24 hours.

2. The method according to claim 1, wherein the basic substance comprises at least one selected from the group consisting of LiOH, NaOH, KOH, RbOH, CsOH and $NH_3$.

3. The method according to claim 1, wherein the acidic liquid medium contains water and at least one acidic substance selected from the group consisting hydrochloric acid, nitric acid and sulfuric acid.

4. The method according to claim 1, wherein the contacting of the heat-treated composition with the basic substance comprises mixing the heat-treated composition with a solution of the basic substance.

5. The method according to claim 4, wherein a concentration of the basic substance in the solution of the basic substance is not less than 0.1 wt % and not more than 80 wt %.

6. The method according to claim 4, wherein the contacting of the heat-treated composition with the basic substance comprises removing at least a part of a solvent present in the solution.

7. The method according to claim 6, wherein a rate of removal of the solvent is not less than 1 wt %.

8. The method according to claim 1, wherein a weight ratio of the basic substance brought into contact with the heat-treated composition is not less than 0.5 wt % relative to the heat-treated composition.

9. The method according to claim 1, wherein the heat treating the composition takes place in the presence of a europium compound.

10. The method according to claim 1, wherein the heat treating the composition takes place at a temperature of not less than 1300° C. and not more than 1600° C.

11. The method according to claim 1, wherein the heat treating the composition takes place in a rare gas atmosphere.

12. The method according to claim 1, wherein the providing of the composition comprises heat treating a mixture comprising an aluminum compound, a europium compound and a silicon nitride.

13. The method according to claim 1, further comprising heat treating the composition in a nitrogen atmosphere between the providing and the heat treating of the composition.

14. The method according to claim 1, wherein the composition has a composition represented by a formula: $Si_{6-z}Al_zO_zN_{8-z}$:Eu, wherein z satisfies $0<z\leq4.2$.

15. The method according to claim 1, further comprising a plural washing of the composition, which has been washed with the acidic liquid medium, with an liquid medium.

16. The method according to claim 15, wherein the plural washing contains at least one washing using a neutral liquid medium.

* * * * *